United States Patent [19]

Wachi

[11] Patent Number: 4,896,310
[45] Date of Patent: Jan. 23, 1990

[54] LIGHT BEAM CONTROL ARRANGEMENTS FOR OPTICAL DISC APPARATUS

[75] Inventor: Shigeaki Wachi, Tokyo, Japan

[73] Assignee: Sony Corporation, Tokyo, Japan

[21] Appl. No.: 219,654

[22] Filed: Jul. 15, 1988

[30] Foreign Application Priority Data

Jul. 31, 1987 [JP] Japan .................. 62-118460[U]
Jan. 29, 1988 [JP] Japan .................. 63-16837

[51] Int. Cl.$^4$ .................................. G11B 7/00
[52] U.S. Cl. .................................. 369/44
[58] Field of Search ............... 369/44, 43, 46; 250/201 DF

[56] References Cited

U.S. PATENT DOCUMENTS

| | | | |
|---|---|---|---|
| 4,627,040 | 12/1986 | Arai et al. ............... | 369/44 |
| 4,710,909 | 12/1987 | Tsuyoshi et al. .......... | 369/46 |
| 4,731,771 | 3/1988 | Maeda et al. ............. | 369/44 |
| 4,835,754 | 5/1989 | Yamamoto et al. ......... | 369/44 |

OTHER PUBLICATIONS

Patent Abstracts of Japan, Unexamined Applications, P Field, vol. 11, No. 40, 2/5/87, p. 131 P 541.
Patent Abstracts of Japan, Unexamined Applications, P Field, vol. 11, No. 32, 1/30/87 p. 131 P 541.
Patent Abstracts of Japan, Unexamined Applications, P Field, vol. 9, No. 141, 6/15/85, p. 68 P 364.
Patent Abstracts of Japan, Unexamined Applications, P Field, vol. 10, No. 254, 8/30/86, p. 95 P 492.
Patent Abstracts of Japan, Unexamined Applications, P Field, vol. 10, No. 374, 12/12/86, p. 128 P 527.

*Primary Examiner*—Donald McElheny, Jr.
*Attorney, Agent, or Firm*—Philip M. Shaw, Jr.

[57] ABSTRACT

A light beam control arrangement for an optical disc apparatus in which a tracking servo control for a light beam projected onto an optical disc is performed in accordance with a tracking error signal and a reproduced information signal is obtained from a record track in the optical disc upon which the light beam impinges, which comprises a differentiation circuit for differentiating one of the tracking error signal and the reproduced information signal to produce a differentiation output signal, a phase detection circuit for phase-detecting the differentiation output signal with the other of the tracking error signal and the reproduced information signal to produce a detection output signal, a low pass filter circuit for producing a DC output signal having a level varying in response to an amplitude of the detection output signal, and a signal mixing circuit for mixing the DC output signal with the tracking error signal so that the DC output signal is used, in addition to the tracking error signal, for the tracking servo control.

9 Claims, 7 Drawing Sheets

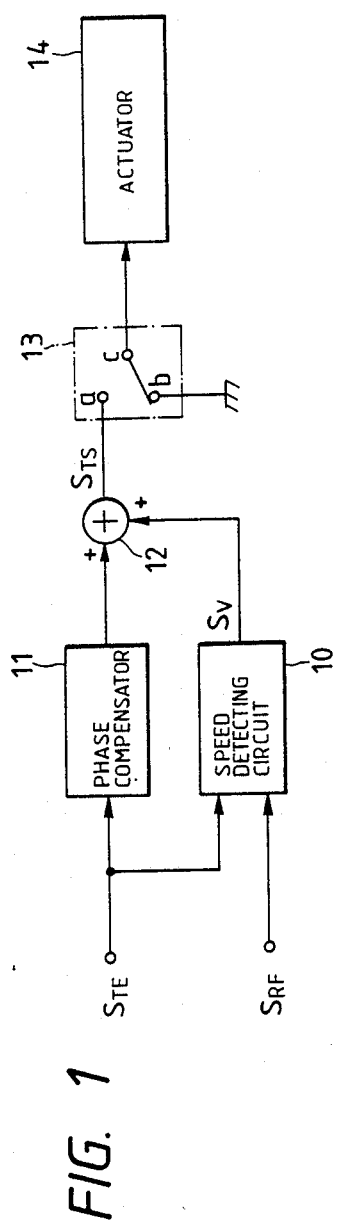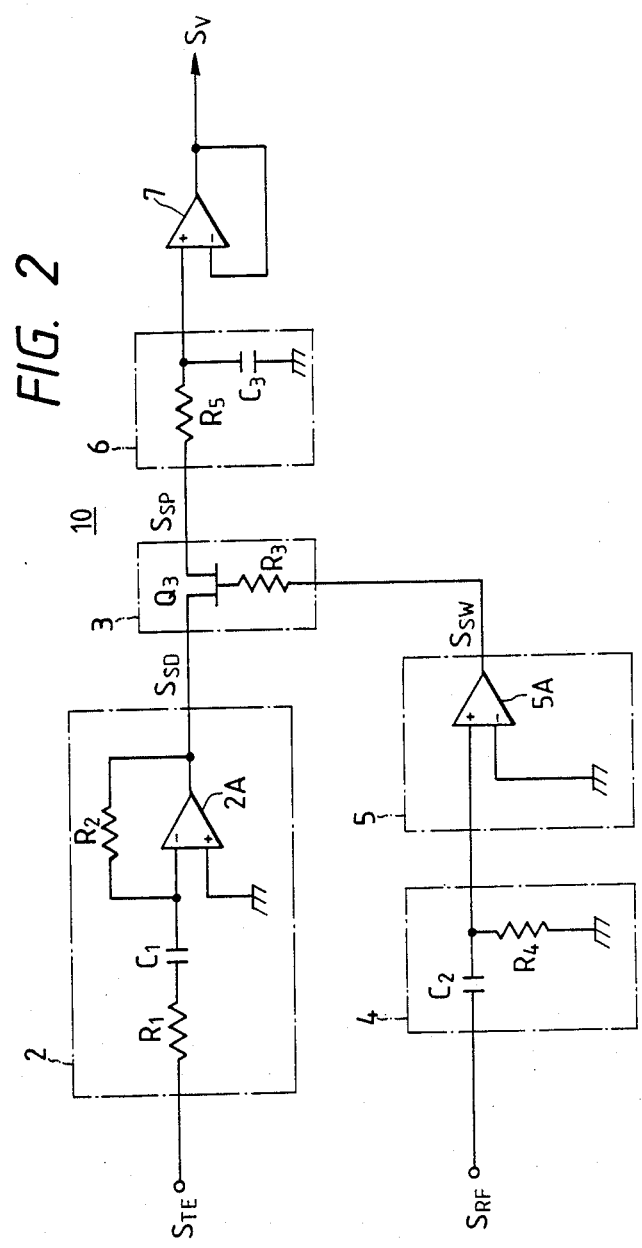
FIG. 1
FIG. 2

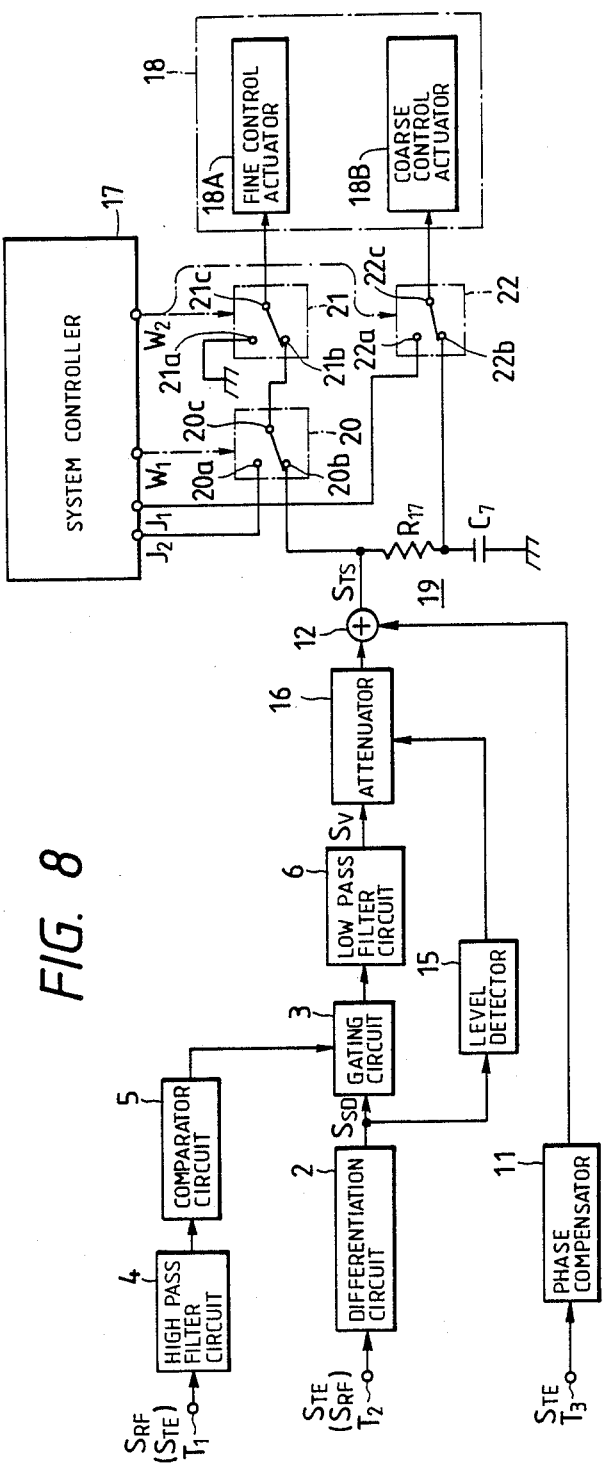
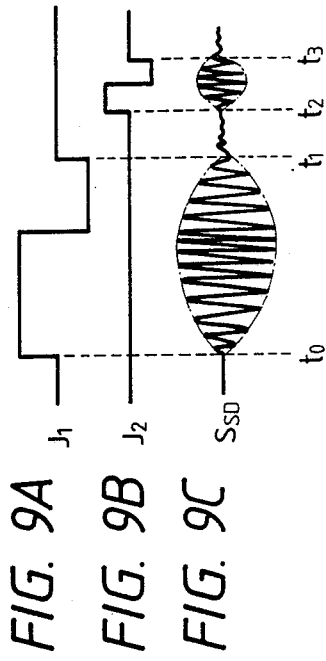
FIG. 8
FIG. 9A
FIG. 9B
FIG. 9C

LIGHT BEAM CONTROL ARRANGEMENTS FOR OPTICAL DISC APPARATUS

BACKGROUND OF THE INVENTION

1. Field of the Invention

The present invention generally relates to light beam control arrangements for optical disc apparatus, and more particularly, is directed to an improvement in a light beam control arrangement provided in an optical disc apparatus in which a tracking servo control for a light beam projected from an optical head device onto an optical disc is performed for keeping the light beam to impinge precisely upon a record track formed in the optical disc in accordance with a tracking error signal.

2. Description of the Prior Art

An optical disc apparatus is known on the art for optically reproducing an information signal from an optical disc in which a record track is formed spirally or a plurality of record tracks are formed concentrically under a condition in which the optical disc is rotated at a predetermined speed. Such an optical disc apparatus is provided with an optical head device which is operative to project a light beam onto the record track in the optical disc loaded on the apparatus for reading an information signal recorded in the record track and to detect the light beam modulated by the record track and reflected from the optical disc for obtaining a reproduced information signal based on the information signal read from the record track.

The optical head device includes a light beam source for emitting the light beam, a beam path determining element, such as an object lens or a movable mirror, for directing the light beam emitted from the light beam source to the optical disc, and a fine control actuator for moving minutely the beam path determining element. For keeping the light beam tracing the record track during rotation of the optical disc, the optical head device is shifted in a direction of the radius of the optical disc by a coarse control actuator provided in the apparatus and the fine control actuator is caused to operate in response to a tracking error signal obtained in response to deviation of the light beam impinging upon the optical disc from the center of the record track so that a tracking servo control is performed.

In connection with the optical disc apparatus, it has been proposed to carry out a search operation in which the light beam is moved quickly to reach a desired position on the optical disc for reproducing the information signal recorded at the desired position. In the search operation, the optical head device in its entirety is moved by the coarse control actuator rapidly in the direction of the radius of the optical disc into a location corresponding to the desired position and then the tracking servo control is performed after the optical head device has been mover into the location corresponding to the desired position so as to cause the light beam projected onto the optical disc to impinge precisely upon the optical track at the desired position.

For reducing the time necessitated for accomplishing the search operation, it is considered to move the optical head device at high speed into the location corresponding to the desired position. However, in the case where the optical head device is moved at high speed in the direction of the radius of the optical disc and stopped at the location corresponding to the desired position, the fine control actuator provided in the optical head device for moving the beam path determining element is caused to raise vibrations so as to swing the light beam in a direction transverse to the record track owing to the movement at high speed and the stoppage of the optical head device because the fine control actuator is constituted with elastic support members. Therefore, although the tracking servo control functions, a proper tracking condition in which the light beam impinges precisely upon the record track at the desired position can not be obtained after the stoppage of the optical head device until the vibrations of the fine control actuator attenuate. This results in a disadvantage that the time required for entering reproduction of the information signal from the record track at the desired position after rapid movement of the optical head device in the search operation is increased.

Further, the vibrations of the fine control actuator by which the light beam impinging upon the optical disc is swung in the direction transverse to the record track are also raised when the fine control actuator working for the tracking servo control is subjected to shocks or vibrations caused by external force. In such a case, a relatively long time is required for recovering a proper tracking condition.

For the purpose of disposing of the disadvantage and problem mentioned above, it has been already proposed to detect speed of relative movement between the optical disc and the light beam impinging upon the optical disc in the direction transverse to the record track by a speed sensor attached to the fine control actuator and to suppress the vibrations of the fine control actuator by supplying the fine control actuator with a control signal produced based on the speed of relative movement detected by the speed sensor, as disclosed in, for example, the Japanese patent application published after examination under publication number 62-15933. However, in practice, a problem arises on this proposal in such a manner as described below.

The fine control actuator is usually constituted to be light and miniaturized in size so as to be improved in response characteristic. Therefore, it is difficult to attach the speed sensor to the fine control actuator and the speed of relative movement between the optical disc and the light beam impinging upon the optical disc in the direction transverse to the record track can not be measured actually.

OBJECTS AND SUMMARY OF THE INVENTION

Accordingly, it is an object of the present invention to provide a light beam control arrangement for an optical disc apparatus in which an optical head device for projecting a light beam onto an optical disc is provided, which can cause the light beam from the optical head device to impinge upon a record track formed in the optical disc without the aforementioned disadvantages and problems encountered with the prior art.

Another object of the present invention is to provide a light beam control arrangement for an optical disc apparatus in which an optical head device for projecting a light beam onto an optical disc is provided, which can detect speed of relative movement between the optical disc and the light beam impinging upon the optical disc in a direction transverse to a record track formed in the optical disc to produce a speed detection signal and suppress quickly swinging movement of the light beam impinging upon the optical disc in the direction transverse to the record track in the optical disc in accordance with the speed detection signal.

A further object of the present invention is to provide a light beam control arrangement for an optical disc apparatus in which a tracking servo control for a light beam projected from an optical head device onto an optical disc is performed for keeping the light beam to impinge precisely upon a record track formed in the optical disc in accordance with a tracking error signal, which is operative to detect speed of relative movement between the optical disc and the light beam impinging upon the optical disc in a direction transverse to the record track in the optical disc to produce a speed detection signal and to suppress quickly swinging movement of the light beam impinging upon the optical disc in the direction transverse to the record track by applying, in addition to the tracking error signal, the speed detection signal to the tracking servo control.

A still further object of the present invention is to provide a light beam control arrangement for an optical disc apparatus in which an optical head device containing a light beam source, a beam path determining element for directing a light beam from the light beam source to an optical disc, and a fine control actuator for moving the beam path determining element is provided, and a search operation in which the optical head device is moved rapidly in a direction of the radius of the optical disc and then the beam path determining element is moved by the fine control actuator is performed to cause the light beam from the optical head device to impinge upon a record track at a desired position on the optical disc, which is operative to detect speed of relative movement between the optical disc and the light beam impinging upon the optical disc in a direction transverse to the record track in the optical disc to produce a speed detection signal and to suppress quickly swinging movement of the light beam impinging upon the optical disc in the direction transverse to the record track by supplying the fine control actuator with the speed detection signal after the optical head device is stopped moving rapidly in the direction of the radius of the optical disc on the occasion of the search operation.

According to the present invention, there is provided a light beam control arrangement for an optical disc apparatus in which a tracking servo control for a light beam projected from an optical head device onto an optical disc is performed for keeping the light beam to trace a record track formed in the optical disc in accordance with a tracking error signal and a reproduced information signal is obtained from the record track upon which the light beam impinges, which comprises a differentiation circuit for differentiating one of the tracking error signal and the reproduced information signal to produce a differentiation output signal, a phase detection circuit for phase-detecting the differentiation output signal with the other of the tracking error signal and the reproduced information signal to produce a detection output signal, a low pass filter circuit for producing a DC output signal having a level varying in response to an amplitude of the detection output signal, and a signal mixing circuit for mixing the DC output signal with the tracking error signal so that the DC output signal is used, in addition to the tracking error signal, for the tracking servo control.

In an embodiment of the light beam control arrangement for an optical disc apparatus according to the present invention, the level of the DC output signal obtained from the low pass filter circuit is subjected to a level control carried out in accordance with the level of the differentiation output signal before being added to the tracking error signal.

In the light beam control arrangement thus constituted in accordance with the present invention, the DC output signal is obtained with the level thereof corresponding to speed of relative movement between the optical disc and the light beam impinging upon the optical disc in a direction transverse to the record track and the polarity thereof corresponding to a sense of direction of movement of the light beam impinging upon the optical disc relative to the record track, so as to be a speed detection output signal. The signal mixing circuit is so arranged that the DC output signal acts as a braking signal to the light beam projected onto the optical disc so as to suppress the movement of the light beam projected onto the optical disc in the direction transverse to the record track when the DC output signal is used for the tracking servo control.

Therefore, when the light beam projected onto the optical disc is cause to have movement in the direction transverse to the record track, such a movement of the light beam in the direction transverse to the record track in the optical disc is quickly suppressed so that the light beam is kept to impinge precisely upon the record track.

Further, on the occasion of the search operation, swinging movements of the light beam projected onto the optical disc in the direction transverse to the record track in the optical disc which are caused after the optical head device is stopped moving rapidly in a direction of the radius of the optical disc, are quickly attenuated and therefore the time required for entering reproduction of an information signal from the record track in the optical disc after rapid movement of the optical head device is effectively reduced.

The above and other objects, features and advantages of the present invention will become apparent from the following detailed description which is to be read in conjunction with the accompanying drawings.

BRIEF DESCRIPTION OF THE DRAWINGS

FIG. 1 is a schematic block diagram showing one embodiment of light beam control arrangement for an optical disc apparatus according to the present invention;

FIG. 2 is a schematic circuit diagram showing an example of a speed detecting circuit used in the embodiment shown in FIG. 1;

FIG. 8 is a schematic block diagram showing another embodiment of light beam control arrangement for an optical disc apparatus according to the present invention; and FIGS. 9A to 9C are waveform diagrams used for explaining the operation of the embodiment shown in FIG. 8.

DESCRIPTION OF THE PREFERRED EMBODIMENTS

Figure 3A:
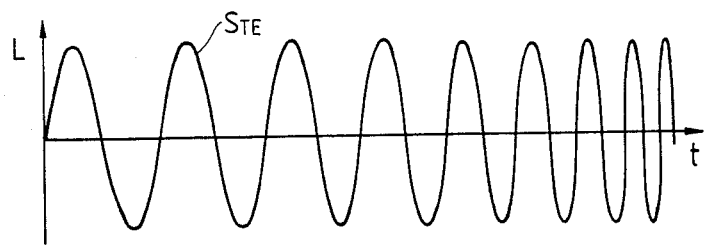
FIGS. 3A to 3F are waveform diagrams used for explaining the operation of the speed detecting circuit shown in FIG. 2.

FIG. 1 shows one embodiment of light beam control arrangement for an optical disc apparatus according to the present invention.

An optical disc apparatus to which the embodiment shown in FIG. 1 is applied is provided with an optical head device which contains a light beam source for emitting a light beam, a beam path determining element, for example, an objective lens, and a fine control actuator for moving minutely the beam path determining element, and is supported to be moved by a coarse control actuator in a direction of the radius of an optical disc loaded on the apparatus.

The optical disc is provided therein a record track formed spirally or a plurality of record tracks formed concentrically in which an information signal is recorded.

The optical head device is operative to project the light beam emitted rom the light beam source and having passed through the beam path determining element onto the optical disc and to receive the light beam reflected from the optical disc so as to produce a reproduced information signal and a tracking error signal obtained in response to deviation of the light beam projected onto the optical disc from the center of the record track.

In the embodiment shown in FIG. 1, a reproduced information signal $S_{RF}$ and a tracking error signal $S_{TE}$ are supplied to a speed detecting circuit 10. The speed detecting circuit 10 produces a speed detection output signal $S_V$ based on both the reproduced information signal $S_{RF}$ and the tracking error signal $S_{TE}$, and supplies a signal mixing circuit 12 with the speed detection output signal $S_V$.

The tracking error signal $S_{TE}$ is also supplied through a phase compensator 11 to the signal mixing circuit 12. In the signal mixing circuit 12, the speed detection output signal $S_V$ is mixed with the tracking error signal $S_{TE}$ to produce a tracking control signal $S_{TS}$. The tracking control signal $S_{TS}$ is supplied to a fixed contact a of a switching circuit 13 which is also provided with another fixed contact b grounded and a movable contact c connected to an actuator 14 which is, for example, the fine control actuator provided in the optical head device. The switching circuit 13 is operative to connect the movable contact c with the fixed contact b so as to prevent the tracking control signal $S_{TS}$ from being supplied to the actuator 14 when the tracking servo control is not to be carried out and to connect the movable contact c with the fixed contact a so as to supply the actuator 14 with the tracking control signal $S_{TS}$ when the tracking servo control is to be performed, for example, after the optical head device is stopped moving rapidly in the direction of the radius of the optical disc in a search operation.

In a condition where the tracking control signal $S_{TS}$ is supplied through the switching circuit 13 to the actuator 14, the beam path determining element provided in the optical head device is moved in accordance with the tracking control signal $S_{TS}$ so as to keep the light beam from the optical head device impinging precisely upon the record track in the optical disc, that is, the tracking servo control is performed. In this connection, the signal mixing circuit 12 is so arranged that the speed detection output signal $S_V$ mixed with the tracking error signal $S_{TE}$ acts, in the actuator 14, as a braking signal for suppressing quickly movement of the light beam projected from the optical head device onto the optical disc in the direction transverse to the record track. Therefore, when the light beam projected onto the optical disc is caused to have, for example, swinging movements in the direction transverse to the record track which are brought about after the optical head device is stopped moving rapidly in the direction of the radius of the optical disc in the search operation, such swinging movements of the light beam in the direction transverse to the record track in the optical disc is quickly attenuated, so that the time required for entering reproduction of the information signal from the record track in the optical disc after rapid movement of the optical head device is reduced.

FIG. 2 shows an example of the speed detecting circuit 10 employed in the embodiment shown in FIG. 1.

Under a condition in which the light beam projected from the optical head device onto the optical disc is moved to traverse a plurality of turns of the record track formed spirally in the optical disc or a plurality of record tracks formed concentrically in the optical disc, such operation as described below is carried out in the example shown in FIG. 2.

Figure 3B:
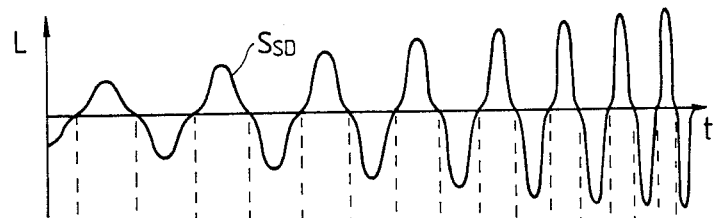

The tracking error signal $S_{TE}$ having the amplitude varying as shown in FIG. 3A in response to the movement of the light beam traversing the record track is supplied to a differentiation circuit 2 which comprises an operational amplifier 2A provided with a negative feedback resistor $R_2$ and supplied with the tracking error signal $S_{TE}$ through a resistor $R_I$ and a capacitor $C_I$. The differentiation circuit 2 is operative to differentiate the tracking error signal $S_{TE}$ to produce a differentiation output signal $S_{SD}$ which is advanced in phase by 90 degrees compared with the tracking error signal $S_{TE}$ and has the amplitude varying in response to the frequency of the tracking error signal $S_{TE}$ which varies in response to the speed of the light beam traversing the record track in the optical disc, that is, to the speed of relative movement between the optical disc and the light beam impinging upon the optical disc, as shown in FIG. 3B. The differentiation output signal $S_{SD}$ is supplied to an input terminal of a gating circuit 3 which constitutes a phase detection circuit.

Figure 3C:
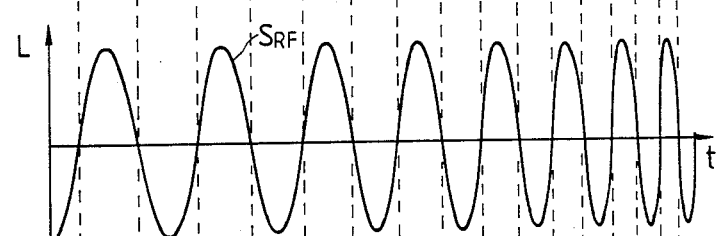
Figure 3D:
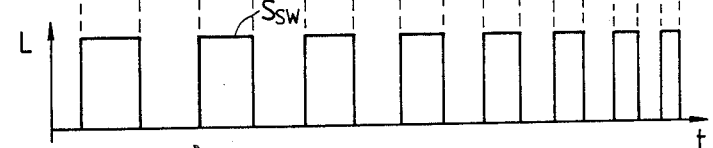

Further, the reproduced information signal $S_{RF}$ which is different in phase by 90 degrees from the tracking error signal $S_{TE}$ in accordance with a sense of direction of the movement of the light beam in relation to the record track in the optical disc, as shown in FIG. 3C, is supplied to a high pass filter circuit 4 comprising a capacitor $C_2$ and a resistor $R_4$. A DC component is eliminated from the reproduced information signal $S_{RF}$ by the high pass filter circuit 4 and the reproduced information signal $S_{RF}$ without the DC component is supplied to a comparator circuit 5 constituted with an operational amplifier 5A. In the comparator circuit 5, the reproduced information signal $S_{RF}$ is compared in level with a reference level to produce a switching signal $S_{SW}$ which has a high level during each period of time in which the level of the reproduced information signal $S_{RF}$ is higher than the reference level and a low level during each period of time in which the level of the reproduced information signal $S_{RF}$ is equal to or lower than the reference level, as shown in FIG. 3D, and is supplied to the gating circuit 3.

Figure 3E:
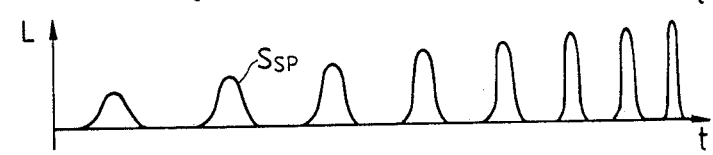

The gating circuit 3 comprises an analog switching element $Q_3$ to which the switching signal $S_{SW}$ is supplied through a resistor $R_3$ from a control terminal connected to the comparator circuit 5, and is in an ON state when the switching signal $S_{SW}$ has the high level and in an OFF state when the switching signal $S_{SW}$ has the low level. In the gating circuit 3, the differentiation output signal $S_{SD}$ from the differentiation circuit 2 is sampled out during each period of time in which the switching signal $S_{SW}$ has the high level to produce a sampled output signal $S_{SP}$ at an output terminal of the gating circuit 3. The sampled output signal $S_{SP}$ is derived from the gating circuit 3 as a phase detection output signal which is obtained by phase-detecting the differentiation output signal $S_{SD}$ with the switching signal $S_{SW}$ and therefore has the amplitude corresponding to positive portions of the differentiation output signal $S_{SD}$, as shown in FIG. 3E and varying in response to the speed of relative movement between the optical disc and the light beam impinging upon the optical disc.

Figure 3F:
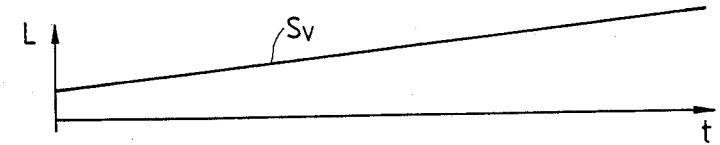

The sampled output signal $S_{SP}$ obtained from the gating circuit 3 is supplied to a low pass filter circuit 6 comprising a resistor $R_5$ and a capacitor $C_3$. The low pass filter circuit 6 is operative to produce, based on the sampled output signal $S_{SP}$, a DC output signal having the level varying in response to the amplitude of the sampled output signal $S_{SP}$ and the polarity corresponding to the polarity of the sampled output signal $S_{SP}$. Such a DC output signal has the level varying in response to the speed of relative movement between the optical disc and the light beam impinging upon the optical disc and the polarity corresponding to the sense of direction of the movement of the light beam in relation to the record track in the optical disc, and therefore constitutes the speed detection output signal $S_V$ as shown in FIG. 3F. The speed detection output signal $S_V$ thus obtained is derived through a buffer circuit 7 from the low pass filter circuit 6 to be supplied to the signal mixing circuit 12 shown in FIG. 1.

Incidentally, in each of FIGS. 3A to 3F, t represents time and L represents level.

In the case of the example mentioned above, the light beam is moved to traverse a plurality turns of the record track formed spirally or a plurality of record tracks formed concentrically in the optical disc in such a sense of direction that the tracking error signal $S_{TE}$ retards in phase by 90 degrees compared with the reproduced information signal $S_{RF}$ as shown in FIGS. 3A and 3C and the speed detection output signal $S_V$ is positive in polarity.

On the contrary, in the case where the light beam is moved to traverse a plurality turns of the record track formed spirally or a plurality of record tracks formed concentrically in the optical disc in a sense of direction opposite to that in the embodiment mentioned above, the tracking error signal $S_{TE}$ is formed to advance in phase by 90 degrees compared with the reproduced information signal $S_{RF}$ and the speed detection output signal $S_V$ is formed to be negative in polarity.

Figure 4:
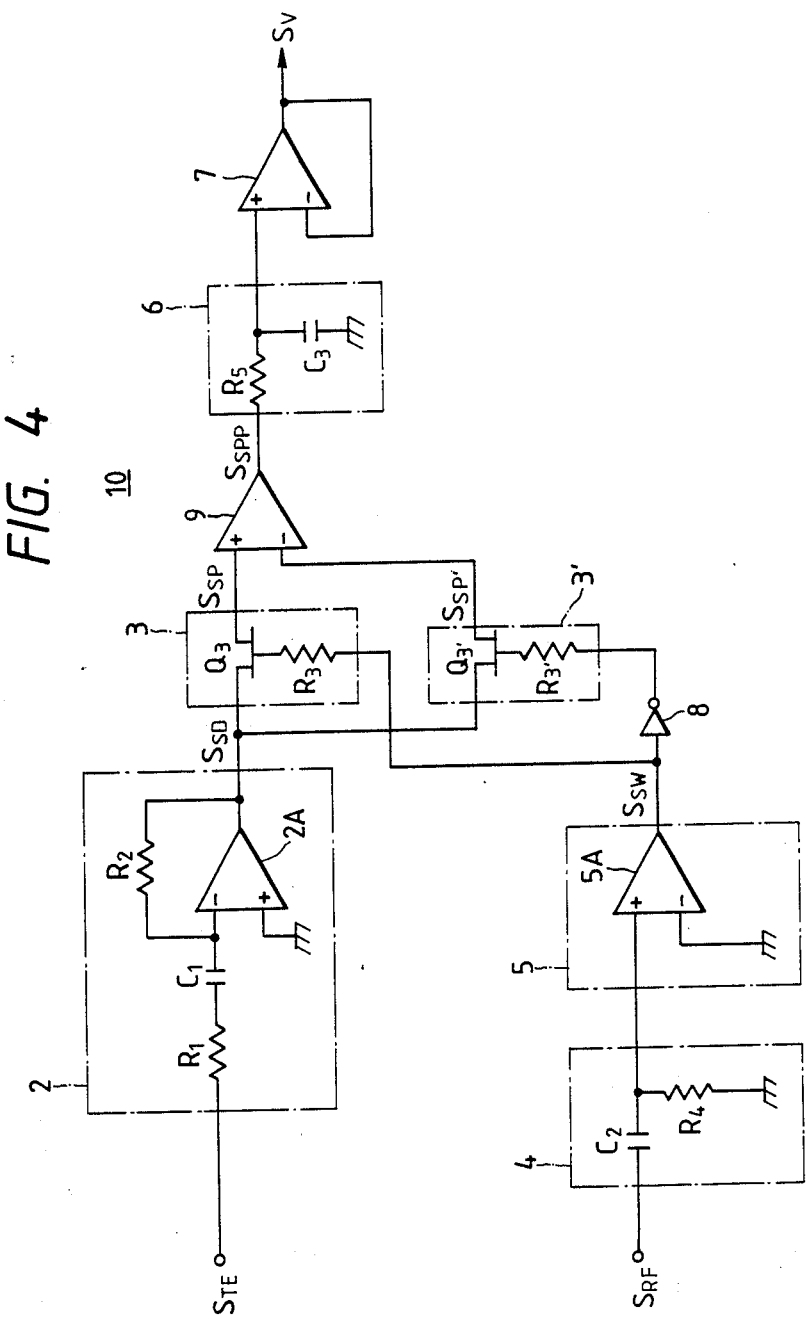
FIG. 4 is a schematic circuit diagram showing another example of the speed detecting circuit used in the embodiment shown in FIG. 1.

FIG. 4 shows another example of the speed detecting circuit 10 employed in the embodiment shown in FIG. 1.

In FIG. 4, blocks, elements and parts corresponding to those of FIG. 2 are marked with the same reference and further description thereof will be omitted.

In the example shown in FIG. 4, another gating circuit 3' which constitutes also a phase detection circuit is provided in addition to the gating circuit 3. A differentiation output signal $S_{SD}$ from a differentiation circuit 2 is supplied to an input terminal of the gating circuit 3' and a switching signal $S_{SW}$ from the comparator circuit 5 is supplied through a phase inverter 8 to a control terminal of the gating circuit 3'. The gating circuit 3' is formed with an analog switching element $Q_3'$ to which the differentiation output signal $S_{SD}$ is supplied directly and the switching signal $S_{SW}$ inverted in phase by the phase inverter 8 is supplied through a resistor $R_3'$.

Figure 5A:
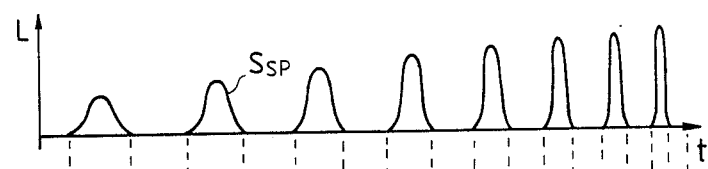
FIGS. 5A to 5D are waveform diagrams used for explaining the operation of the speed detecting circuit shown in FIG. 4.
Figure 5B:
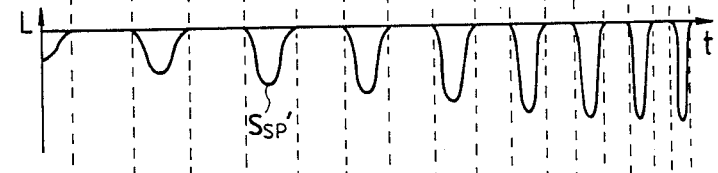

In the gating circuit 3', the differentiation output signal $S_{SD}$ is sampled out during each period of time in which the switching signal $S_{SW}$ inverted in phase by the phase inverter 8 has the high level to produce a sampled output signal $S_{SP}'$ at an output terminal of the gating circuit 3'. The sampled output signal $S_{SP}'$ is derived from the gating circuit 3' as a phase detection output signal which is obtained by phase-detecting the differentiation output signal $S_{SD}$ with the switching signal $S_{SW}$ inverted in phase by the phase inverter 8 and therefore has the amplitude corresponding to negative portions of the differentiation output signal $S_{SD}$, as shown in FIG. 5B, contrary to a sampled output signal $S_{SP}$ derived from the gating circuit 3 which has the amplitude corresponding to positive portions of the differentiation output signal $S_{SD}$, as shown in FIG. 5A.

Figure 5C:
Figure 5D:
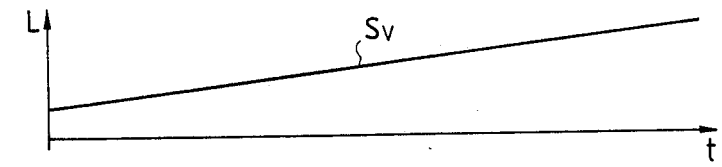

The sampled output signal $S_{SP}$ obtained from the gating circuit 3 and the sampled output signal $S_{SP}'$ obtained from the gating circuit 3' are supplied to an adding circuit 9 to produce a combined phase detection output signal $S_{SPP}$ which has the amplitude varying at frequency twice as high as the frequency of each of the sampled output signals $S_{SP}$ and $S_{SP}'$, as shown in FIG. 5C. Then, the combined phase detection output signal $S_{SPP}$ is supplied to a low pass filter circuit 6. The low pass filter circuit 6 is operative to produce, based on the combined phase detection output signal $S_{SPP}$, a DC output signal having the level varying in response to the amplitude of the combined phase detection output signal $S_{SPP}$ and the polarity corresponding to the polarity of the combined phase detection output signal $S_{SPP}$. Such a DC output signal constitutes the speed detection output signal $S_V$ as shown in FIG. 3F.

In the case of the example shown in FIG. 4, the speed detection output signal $S_V$ is obtained based on both the sampled output signals $S_{SP}$ and $S_{SP}'$, and therefore can be expected to be improved in accuracy in representing the speed of relative movement between the optical disc and the light beam impinging upon the optical disc.

Figure 6:
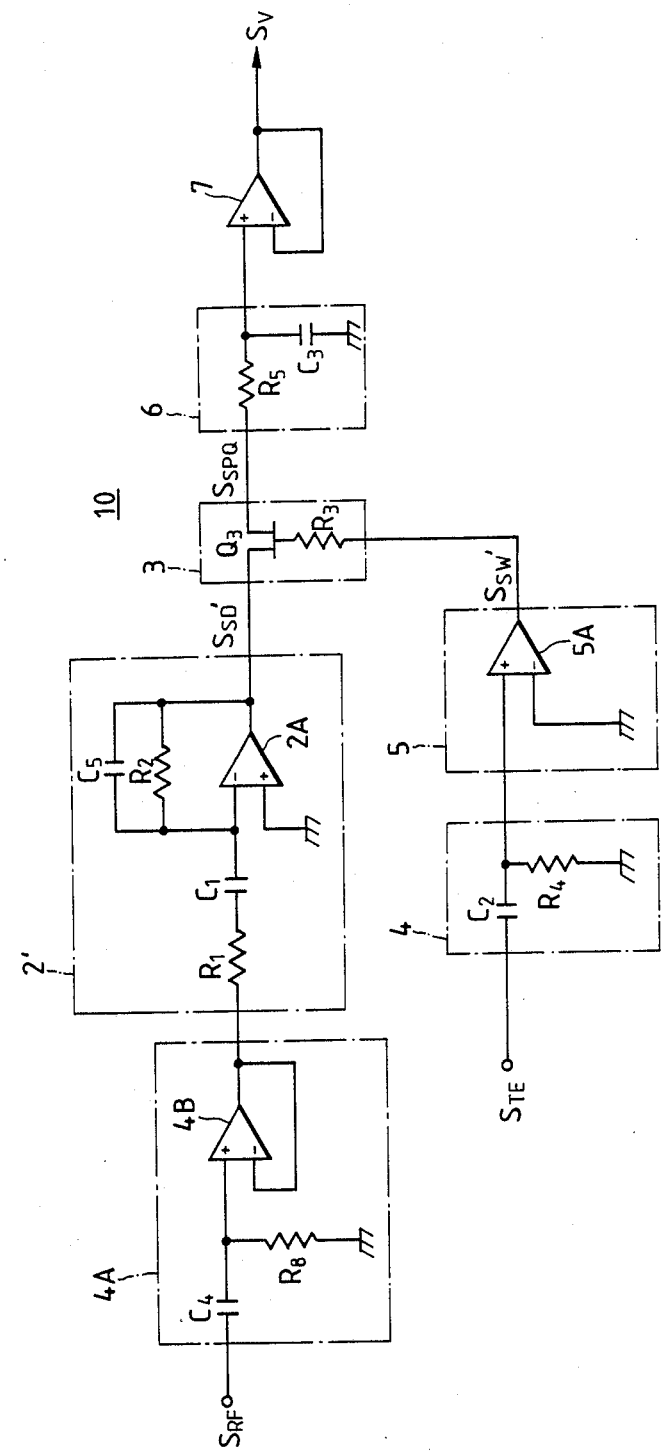
FIG. 6 is a schematic circuit diagram showing a further example of the speed detecting circuit used in the embodiment shown in FIG. 1.

FIG. 6 shows a further example of the speed detecting circuit 10 employed in the embodiment shown in FIG. 1. In FIG. 6 also, blocks, elements and parts corresponding to those of FIG. 2 are marked with the same references and further description thereof will be omitted.

In the example shown in FIG. 6, the reproduced information signal $S_{RF}$ as shown in FIG. 3C is supplied to a high pass filter circuit 4A comprising a capacitor $C_4$, a resistor $R_8$ and a voltage follower 4B formed with an operational amplifier. A DC component is eliminated from the reproduced information signal $S_{RF}$ by the high pass filter circuit 4A and the reproduced information signal $S_{RF}$ without the DC component is supplied to a differentiation circuit 2' which comprises an operational amplifier 2A provided with a negative feedback path formed with a parallel connection of a resistor $R_2$ and a capacitor $C_5$ and supplied with the reproduced information signal $S_{RF}$ without the DC component through a resistor $R_l$ and a capacitor $C_l$. The differentiation circuit 2' is operative to differentiate the reproduced information signal $S_{RF}$ without the DC component to produce a differentiation output signal $S_{SD}'$ which is advanced in phase by 90 degrees compared with the reproduced information signal $S_{RF}$ and has the amplitude varying in response to the speed of relative movement between the optical disc and the light beam impinging upon the optical disc. The differentiation output signal $S_{SD}'$ is supplied to a gating circuit 3.

Further, the tracking error signal $S_{TE}$ as shown in FIG. 3A is supplied to a high pass filter circuit 4 so that a DC component is eliminated from the tracking error signal $S_{TE}$ by the high pass filter circuit 4 and the tracking error signal $S_{TE}$ without the DC component is supplied to a comparator circuit 5. In the comparator circuit 5, the tracking error signal $S_{TE}$ is compared in level with a reference level to produce a switching signal $S_{SW}'$ which has a high level during each period of time in which the level of the tracking error signal $S_{TE}$ is higher than the reference level and a low level during each period of time in which the level of the tracking error signal $S_{TE}$ is lower than the reference level and is supplied with the gating circuit 3.

In the gating circuit 3, the differentiation output signal $S_{SD}'$ from the differentiation circuit 2' is sampled out during each period of time in which the switching signal $S_{SW}'$ has the high level to produce a sampled output signal $S_{SPQ}$ at an output terminal of the gating circuit 3. The sampled output signal $S_{SPQ}$ is derived from the gating circuit 3 in the same manner as the sampled output signal $S_{SP}$ in the example shown in FIG. 2 and therefore the speed detection output signal $S_V$ is derived through a buffer circuit 7 from a low pass filter circuit 6 similarly to that in the example shown in FIG. 2.

Figure 7:
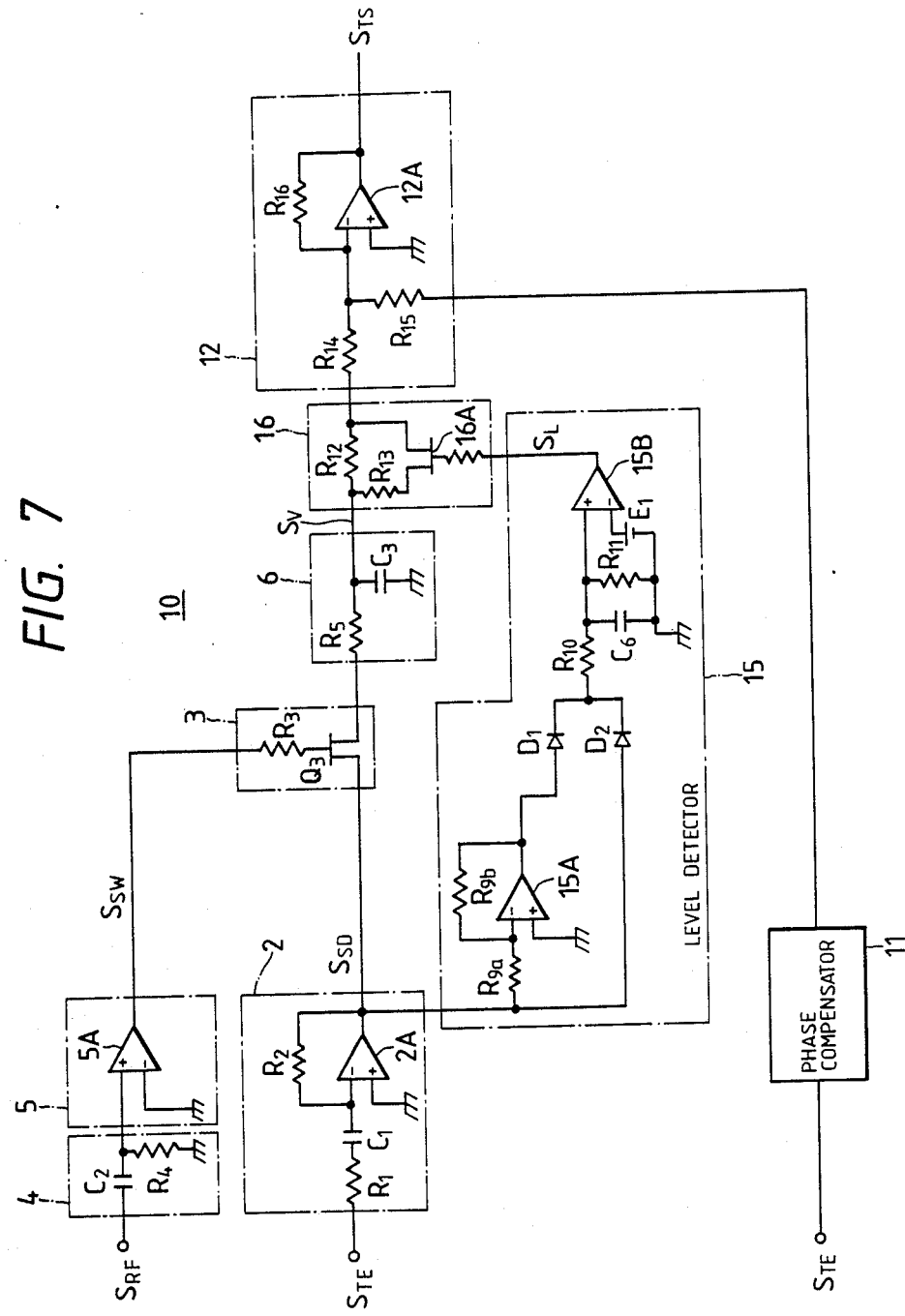
FIG. 7 is a schematic circuit diagram showing a still further example of the speed detecting circuit used in the embodiment shown in FIG. 1.

FIG. 7 shows a still further example of the speed detecting circuit 10 employed in the embodiment shown in FIG. 1, together with a part of the embodiment shown in FIG. 1.

In FIG. 7 also, blocks, elements and parts corresponding to those of FIG. 2 are marked with the same references and further description thereof will be omitted.

In the example shown in FIG. 7, a level detector 15 for detecting the level of a differentiation output signal $S_{SD}$ obtained from a differentiation circuit 2 and an attenuator 16 for limiting the level of a speed detection output signal $S_V$ obtained from a low pass filter circuit 6 in response to a detection output signal obtained from the level detector 15, are provided in addition to such a circuit arrangement as shown in FIG. 2.

In the level detector 15, the differentiation output signal $S_{SD}$ obtained from the differentiation circuit 2 is inverted in phase by an amplifying circuit comprising an operational amplifier 15A and resistors $R_{9a}$ and $R_{9b}$ and then supplied to a diode $D_I$ and further directly supplied to a diode $D_2$. The diodes $D_I$ and $D_2$ constitute a rectifying circuit together with a resistor $R_{10}$ connected with each of the diodes $D_1$ and $D_2$ and a parallel connection of a capacitor $C_6$ and a resistor $R_{11}$ coupled with the resistor $R_{10}$. Therefore, the differentiation output signal $S_{SD}$ is subjected to a full wave rectification by the rectifying circuit including the diodes $D_1$ and $D_2$ to produce a rectified output signal having the level corresponding to the frequency of the differentiation output signal $S_{SD}$. The rectified output signal is compared in level with a predetermined constant level $E_1$ in a comparator circuit 15B to produce at an output terminal of the comparator circuit 15B a comparison output signal $S_L$ which has a high level when the level of the rectified output signal is higher than the constant level $E_1$ and a low level when the level of the rectified output signal is equal to or lower than the constant level $E_1$. The comparison output signal $S_L$ thus obtained is supplied to a control terminal of the attenuator 16.

The attenuator 16 is formed to have a first signal path formed by a resistor $R_{12}$ and a second signal path formed by a series connection of a resistor $R_{13}$ and a switching element 16A, and the first and second signal paths are connected in parallel to each other with the low pass filter circuit 6 in such a manner that the speed detection output signal $S_V$ is supplied to both the first and second signal paths. The switching element 16A is in an ON state so as to allow the speed detection output signal $S_V$ to pass through the second signal path when the comparison output signal $S_L$ has the high level and in an OFF state so as to prevent the speed detection output signal $S_V$ from passing through the second signal path.

Accordingly, when the frequency of the differentiation output signal $S_{SD}$ is relatively high, that is, the speed of relative movement between the optical disc and the light beam impinging upon the optical disc is relatively high, the comparison output signal $S_L$ has the high level so as to cause the switching element 16A in the attenuator 16 to be in the ON state and therefore the speed detection output signal $S_V$ passes through both the first and second signal paths connected in parallel to each other in the attenuator 16 to appear at an output terminal of the attenuator 16 with a relatively large level. On the other hand, when the frequency of the differentiation output signal $S_{SD}$ is relatively low, that is, the speed of relative movement between the optical disc and the light beam impinging upon the optical disc is relatively low, the comparison output signal $S_L$ has the low level so as to cause the switching element 16A in the attenuator 16 to be in the OFF state and therefore the speed detection output signal $S_V$ passes through only the first signal path in the attenuator 16 to appear at the output terminal of the attenuator 16 with a relatively small level.

The speed detection output signal $S_V$ which has been subjected to the level control by the attenuator 16 is applied to the signal mixing circuit 12. In the circuit arrangement shown in FIG. 7, the signal mixing circuit 12 comprises an operational amplifier 12A provided with resistors $R_{14}$, $R_{15}$ and $R_{16}$ to form an adding circuit. In the signal mixing circuit 12, the speed detection output signal $S_V$ which is supplied to the resistor $R_{14}$ is added to the tracking error signal $S_{TE}$ which is supplied through the phase compensator 11 to the resistor $R_{15}$ in the signal mixing circuit 12 to produce the tracking control signal $S_{TS}$.

With the level control of the speed detection output signal $S_V$ carried out as mentioned above, the movement of the light beam projected onto the optical disc in the direction transverse to the record track is suppressed much more effectively during the tracking servo control.

The attenuator 16 can be modified to be operative to reduce the level of the speed detection output signal $S_V$ at multistage variations or gradually.

FIG. 8 shows another embodiment of light beam control arrangement for an optical disc apparatus according to the present invention, which is applied also to such an optical disc apparatus as described above in connection with the embodiment shown in FIG. 2.

The embodiment shown in FIG. 8 is provided with differentiation circuit 2, gating circuit 3, high pass filter circuit 4, comparator circuit 5, low pass filter circuit 6, phase compensator 11, signal mixing circuit 12, level detector 15 and attenuator 16 in the same manner as those provided in the circuit arrangement shown in FIG. 7 and described above. Further, a signal input terminal $T_1$ to which a reproduced information signal $S_{RF}$ or a tracking error signal $S_{TE}$ is applied, a signal input terminal $T_2$ to which the tracking error signal $S_{TE}$ or the reproduced information signal $S_{RF}$ is applied, and a signal input terminal $T_3$ to which the tracking error signal $S_{TE}$ is applied, are provided.

In the embodiment shown in FIG. 8, a tracking control signal $S_{TS}$ obtained by adding the speed detection output signal $S_V$ having passed through the attenuator 16 to the tracking error signal $S_{TE}$ in the signal mixing circuit 12 is supplied through switches 20 and 21 each controlled by a system controller 17 to a fine control actuator 18A contained in a tracking driver 18, and further supplied through a low pass filter circuit 19 composed of a resistor $R_{17}$ and a capacitor $C_7$ and a switch 22 controlled also by the system controller 17 to a coarse control actuator 18B contained in the tracking driver 18.

The system controller 17 is operative to send out a first switch control signal $W_1$ for a small scale search operation to the switch 20 and a second switch control signal $W_2$ for a large scale search operation to each of the switches 21 and 22, and further to supply the switches 20 and 22 with a large scale search signal $J_1$ and a small scale search signal $J_2$, respectively.

When the large scale search operation is performed, the switch 20 is in a condition in which a movable contact 20c is connected with a fixed contact 20b to which the tracking control signal $S_{TS}$ is supplied, the switch 21 is caused by the second switch control signal $W_2$ to have a movable contact 21c connected with a fixed contact 21a grounded, and the switch 22 is caused by the second switch control signal $W_2$ to have a movable contact 22c connected with a fixed contact 22a to which the large scale search signal $J_1$ is supplied, so that the large scale search signal $J_1$ is supplied through the switch 22 to the coarse control actuator 18B. The large scale search signal $J_1$ has relatively wide rectangular pulses between time points $t_0$ and $t_1$ as shown in FIG. 9A, and thereby the large scale search operation is carried out during a period from the time point $t_0$ to the time point $t_1$, so that the optical head device is moved rapidly in the direction of the radius of the optical disc into a location corresponding to a desired position on the optical disc. During the large scale search operation thus performed, the differentiation output signal $S_{SD}$ obtained from the differentiation circuit 2 varies with large amplitude as shown in FIG. 9C.

Then, after the optical head device is stopped moving rapidly in the direction of the radius of the optical disc, the movable contact 21c of the switch 21 is returned to be connected with the fixed contact 21b connected to the movable contact 20c of the switch 20 so that the tracking control signal $S_{TS}$ is supplied through the switches 20 and 1 to the fine control actuator 18A and the movable contact 22c of the switch 21 is returned to be connected with the fixed contact 22b connected to the low pass filter circuit 19 so that a low frequency component of the tracking control signal $S_{TS}$ is supplied through the switches 22 to the coarse control actuator 18B. As a result, the tracking servo control is performed. In such a condition, during a period from the time point $t_1$ to a time point $t_2$ shown in FIGS. 9A to 9C, the speed detection output signal $S_V$ contained in the tracking control signal $S_{TS}$ acts in the fine control actuator 18A as a braking signal for suppressing the movement of the light beam projected onto the optical disc in the direction transverse to the record track, and therefore the light beam projected onto the optical disc is caused quickly to impinge precisely upon the record track after the optical head device is stopped moving rapidly in the direction of the radius of the optical disc.

In the case where the light beam has not reached a target record track at the desired position before the time point $t_2$, the switch 20 is caused by the first switch control signal $W_1$ to have the movable contact 20c connected with a fixed contact 20a to which the small scale search signal $J_2$ is supplied, so that the small scale search signal $J_2$ is supplied through the switches 20 and 21 to the fine control actuator 18A. The small scale search signal $J_2$ has relatively narrow rectangular pulses between time points $t_2$ and $t_3$ as shown in FIG. 9B, and thereby the small scale search operation is carried out during a period from the time point $t_2$ to the time point $t_3$, so that the light beam projected onto the optical disc is moved to traverse a plurality of turns of the record track formed spirally or a plurality of record tracks formed concentrically into the target record track at the desired position. During the small scale search operation thus performed, the differentiation output signal $S_{SD}$ obtained from the differentiation circuit 2 varies with small amplitude as shown in FIG. 9C.

Then, after the time point $t_3$, the movable contact 20c of the switch 20 is returned to be connected with the fixed contact 20b so that the tracking control signal $S_{TS}$ is supplied through the switches 20 and 21 to the fine control actuator 18A, and thereby the tracking servo control is performed. Under such a tracking servo control, the light beam projected onto the optical disc is caused to impinge precisely upon the target record track at the desired position and then to trace the record track.

What is claimed is:

1. A light beam control arrangement for an optical disc apparatus in which a tracking servo control for a light beam projected from an optical head device onto an optical disc is performed for keeping the light beam to trace a record track formed in the optical disc in accordance with a tracking error signal and a reproduced information signal is obtained from the record track upon which the light beam impinges, the arrangement comprising:

differentiation means for differentiating one of the tracking error signal and the reproduced information signal to produce a differentiation output signal, phase detection means for phase-detecting said differentiation output signal with the other of the tracking error signal and the reproduced information signal to produce a detection output signal, low pass filter means for producing a DC output signal having a level varying in response to an amplitude of said detection output signal, and signal mixing means for mixing said DC output signal with the tracking error signal so that said DC output signal is used, in addition to the tracking error signal, for the tracking servo control.

2. A light beam control arrangement according to claim 1, wherein said phase detection means comprises comparing means for comparing a level of the other of the tracking error signal and the reproduced information signal with a reference level to produce a comparison output signal, and gating means for sampling said differentiation output signal by said comparison output signal.

3. A light beam control arrangement according to claim 2, wherein said phase detection means further comprises high pass filter means for eliminating a DC component from the other of the tracking error signal and the reproduced information signal supplied to said comparing means.

4. A light beam control arrangement according to claim 2, wherein said gating means comprises a switching element supplied with said differentiation output signal and caused to be in ON and OFF states selectively by said comparison output signal.

5. A light beam control arrangement according to claim 1, wherein said signal mixing means comprise an adder circuit for adding said DC output signal to the tracking error signal.

6. A light beam control arrangement according to claim 1 further comprising level detecting means for detecting a level of the differentiation output signal to produce a level detection output signal representing the level of the differentiation output signal and level control means for controlling a level of said DC output signal in accordance with said level detection output signal 7. A light beam control arrangement according to claim 6, wherein said level control means comprises attenuating means for attenuating the level of said DC output signal in accordance with said level detection output signal.

8. A light beam control arrangement according to claim 7, wherein said attenuating means comprises a pair of signal paths each including resistance and connected in parallel to each other to be supplied with said DC output signal, one of said signal paths including means for varying conductivity of said one of said signal paths in accordance with said level detection output signal.

9. A light beam control arrangement according to claim 8, wherein said means for varying conductivity comprises a switching element caused to be in ON and OFF states selectively by said level detection output signal.

* * * * *